(12) United States Patent
Durr et al.

(10) Patent No.: US 6,918,291 B2
(45) Date of Patent: Jul. 19, 2005

(54) PRESSURE GAUGE AND CAP

(75) Inventors: Alaric Scott Durr, West Harrison, IN (US); Bobby Lynn Lawrence, Lawrenceburg, IN (US); Amy Lynn Miller, Cleves, OH (US); Bryan Thomas Humpert, Cincinnati, OH (US); Gregory Allen Kramer, Fairfield, OH (US)

(73) Assignee: Campbell Hausfeld/Scott Fetzer Company, Harrison, OH (US)

( * ) Notice: Subject to any disclaimer, the term of this patent is extended or adjusted under 35 U.S.C. 154(b) by 5 days.

(21) Appl. No.: 10/424,036

(22) Filed: Apr. 25, 2003

(65) Prior Publication Data

US 2004/0187567 A1 Sep. 30, 2004

Related U.S. Application Data

(63) Continuation-in-part of application No. 29/178,394, filed on Mar. 25, 2003, now Pat. No. Des. 501,146.
(51) Int. Cl.⁷ .............................................. B60C 23/02
(52) U.S. Cl. ..................................................... 73/146.2
(58) Field of Search ............................... 73/146.2, 146, 73/146.3, 146.4, 146.5, 146.8

(56) References Cited

U.S. PATENT DOCUMENTS

| D156,807 S | 1/1950 | Battersby | D10/86 |
|---|---|---|---|
| 2,551,487 A | 5/1951 | Crowley | 73/744 |
| 2,660,890 A | 12/1953 | Fletcher | 73/731 |
| 3,140,603 A | 7/1964 | Williams | 73/146.3 |
| 3,805,620 A | 4/1974 | Ali Zade et al. | 73/744 |
| 4,574,629 A | 3/1986 | Weng | |
| 4,768,460 A | 9/1988 | Soon-Fu | 116/272 |

(Continued)

OTHER PUBLICATIONS

Aerostich, 2002, p. 140, tire gauges, [retrieved on May 29, 2004]. Retrieved from internet using Google Advanced catalog search, URL:www.aerostich.com.

(Continued)

*Primary Examiner*—William Oen
*Assistant Examiner*—Andre Allen
(74) *Attorney, Agent, or Firm*—Jones Day

(57) ABSTRACT

An apparatus comprises a gauge for measuring a parameter. The gauge has a sensing section configured to react to exposure to the parameter in a manner indicative of the parameter. The gauge further has a port through which the sensing section is exposed to the parameter. A cap is configured to be removably attached to the gauge such that the cap covers the port to protect the port from damage. The cap has a hole configured to allow coupling of the cap to another device.

22 Claims, 5 Drawing Sheets

U.S. PATENT DOCUMENTS

| | | | |
|---|---|---|---|
| 4,827,764 A | | 5/1989 | Hwang |
| 5,435,173 A | | 7/1995 | Hwang |
| D390,140 S | * | 2/1998 | Germanton .................. D10/86 |
| 5,908,984 A | | 6/1999 | Chuang ..................... 73/146.3 |
| 5,952,568 A | * | 9/1999 | Bedell, Jr. ................. 73/146.5 |
| 5,971,382 A | * | 10/1999 | Scheufler, Jr. ............... 269/47 |
| D427,092 S | | 6/2000 | Wu |
| D427,093 S | | 6/2000 | Wu |
| 6,125,694 A | * | 10/2000 | Bledsoe ..................... 73/146.8 |
| D441,674 S | | 5/2001 | Van Zeyl .................... D10/86 |
| D455,361 S | | 4/2002 | Super et al. |
| 6,385,554 B1 | | 5/2002 | Wu ............................. 702/140 |
| D458,857 S | | 6/2002 | Tseng ......................... D10/86 |
| D459,257 S | | 6/2002 | Petrucelli |
| D459,668 S | | 7/2002 | Petrucelli |
| D462,627 S | | 9/2002 | Petrucelli |
| D469,706 S | | 2/2003 | Huang |
| D472,172 S | | 3/2003 | Fujioka et al. ............... D10/86 |
| 6,542,848 B1 | * | 4/2003 | Neeser et al. ............... 702/156 |
| 2002/0174723 A1 | * | 11/2002 | Chuang ....................... 73/700 |

OTHER PUBLICATIONS

Matco Tools, 2001–2002, p. 353, digital tire pressure gauges, [retrieved on May 29, 2004]. Retrieved from internet using Google Advanced Catalog search, URL:www.matcotools.com.

Catalog sheet for "Deluxe Digital Tire Gauge", copyright 2003, from RadioShack web site. Retrieved from the Internet: <URL:http://www.radioshack.com/product.asp?catalog%5Fname=CTLG&product%5Fid=63%2D1114>.

Product manual for "Deluxe Digital Tire Gauge", copyright 2002, from RadioShack web site. Retrieved from the Internet: <URL:http://support.radioshack.com/support_auto/doc66/66757.pdf>.

* cited by examiner

PRESSURE GAUGE AND CAP

CROSS-REFERENCE TO RELATED APPLICATIONS

This is a continuation-in-part of U.S. Design patent application Ser. No. 29/178,394, filed Mar. 25, 2003 now U.S. Pat. No. Des. 501,146, which is hereby incorporated herein by reference.

TECHNICAL FIELD

The present invention relates to a pressure gauge and an adjoining cap.

BACKGROUND

A gauge is used to measure air pressure of a tire. The gauge has a sensing section configured to react to exposure to the pressure in a manner indicative of the pressure. A display section of the gauge displays a value indicative of the pressure based on the reaction of the sensing section. The gauge further has a port through which the sensing section is exposed to the air pressure when the port is pushed over a valve stem of the tire.

SUMMARY

An apparatus embodying the present invention comprises a gauge for measuring a parameter. The gauge has a sensing section configured to react to exposure to the parameter in a manner indicative of the parameter. The gauge further has a port through which the sensing section is exposed to the parameter. A cap is configured to be removably attached to the gauge such that the cap covers the port to protect the port from damage. The cap has a hole configured to allow coupling of the cap to another device.

Preferably, the parameter is air pressure of a tire, and the port is configured to be pushed over a valve stem of the tire. The cap is further configured to prevent dust and moisture from entering the port. A seal encircling the port is formed between the gauge and the cap. The gauge has a screw thread surrounding the port, and the cap has a mating screw thread, such that the cap is removably attached to the gauge by screwing the cap to the gauge. The screw thread of the cap is centered on an axis, and the hole perpendicularly intersects the axis. The gauge and the cap, when attached together, define a peripheral contour centered on an axis to define axially front and rear ends. The contour has a size that is suitable for fitting in a pocket and a shape that tapers off gradually from the middle of the contour toward the front and rear ends. The other device is a link of a key chain.

Another apparatus comprises a gauge for measuring a parameter. The gauge has an inlet port for communicating with a source of the parameter. The apparatus further comprises a support removably attached to the inlet port for coupling the gauge to another device.

Preferably, the parameter is air pressure. The support is a cap having a plug for seating inside the inlet port of the gauge. The other device is a key chain, and the support includes an opening for accepting a loop of the key chain. Alternatively, the other device is a belt loop, and the support includes an attachment point for accepting a tether having a fastener for attaching to a belt loop, wherein the tether is one of a cord, a chain, a string, a lash, a tie, and a cable. Alternatively, the other device is a work station, and the support includes an attachment point for accepting a tether having a fastener for attaching to a work station, wherein the tether is one of a cord, a chain, a string, a lash, a tie, and a cable.

Another apparatus comprises a gauge for measuring an air pressure. The gauge has an inlet port for communicating with a source of air pressure. The apparatus further comprises means for removably supporting the gauge, and also means for attaching the supporting means to a remote member.

Preferably, the remote member is one of a key chain, a belt loop, or a work station. The means for removably supporting the gauge is configured to couple to the inlet port of the gauge. The means for removably supporting the gauge is a cap having a plug for inserting into the inlet port, with the plug and the inlet port being configured to couple together. The plug of the cap includes a first screw thread and the inlet port includes a second screw thread, with the first and second screw threads being configured to couple the plug to the inlet port. The means for attaching the supporting means to a remote member includes a tether coupled to the supporting means and a fastener for coupling to the remote member. The tether is one of a cord, a chain, a string, a lash, a tie, and a cable.

DESCRIPTION

Figure 1:
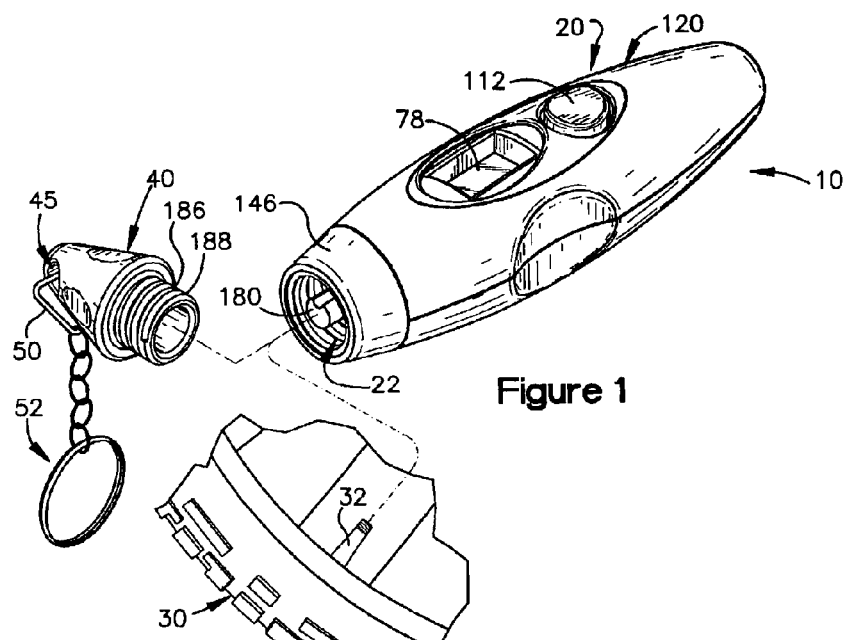
FIG. 1 is a perspective view of an apparatus embodying the present invention, the apparatus including a gauge and cap, shown along with a tire.

The apparatus 10 shown in FIG. 1 has parts which, as described below, are examples of the elements recited in the claims.

Figure 2:
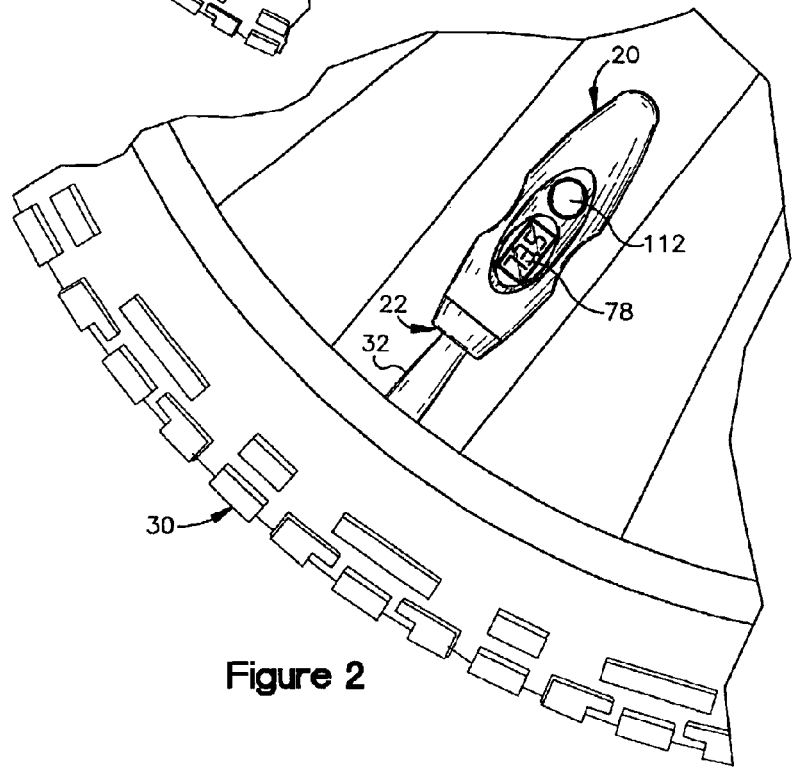
FIG. 2 is a top view of the gauge, shown being used with the tire to measure tire pressure.
Figure 3:
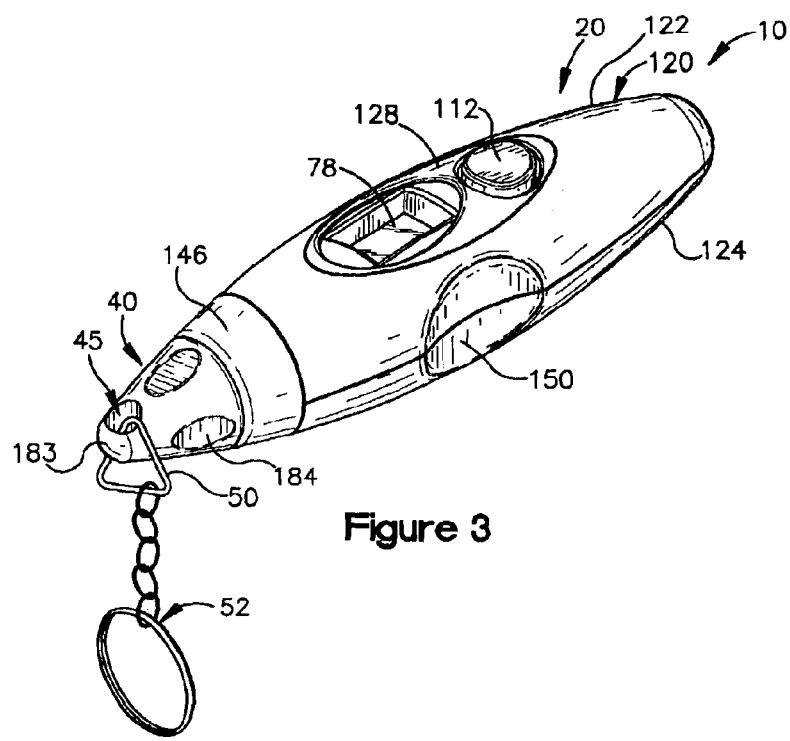
FIG. 3 is a perspective view of the gauge, shown attached to the cap.

The apparatus 10 includes a gauge 20 with an inlet port 22. The gauge 20 is used to measure a parameter, in this example, pressure of air in a tire 30. The air can be released through a valve stem 32 of the tire 30. The inlet port 22 of the gauge 20 is pushed over the stem 32, as shown in FIG. 2, when measuring the pressure. The apparatus further includes a cap 40 that can be removably attached to the gauge 20, as shown in FIG. 3, when the gauge 20 is not being used for measuring the air pressure. The cap 40 serves as a support for the gauge 20 when the gauge 20 is not in use. For this purpose, the cap 40 has an attachment point in the form of a through-hole 45 for attaching the cap 40, and thus the gauge 20, to a link 50 of a key chain 52. Alternatively, the cap 40 may include an attachment point, a tether, and a fastener for attaching the gauge 20 to another device, such as a belt loop, a key chain, or a work station, among other remote members.

Figure 4:
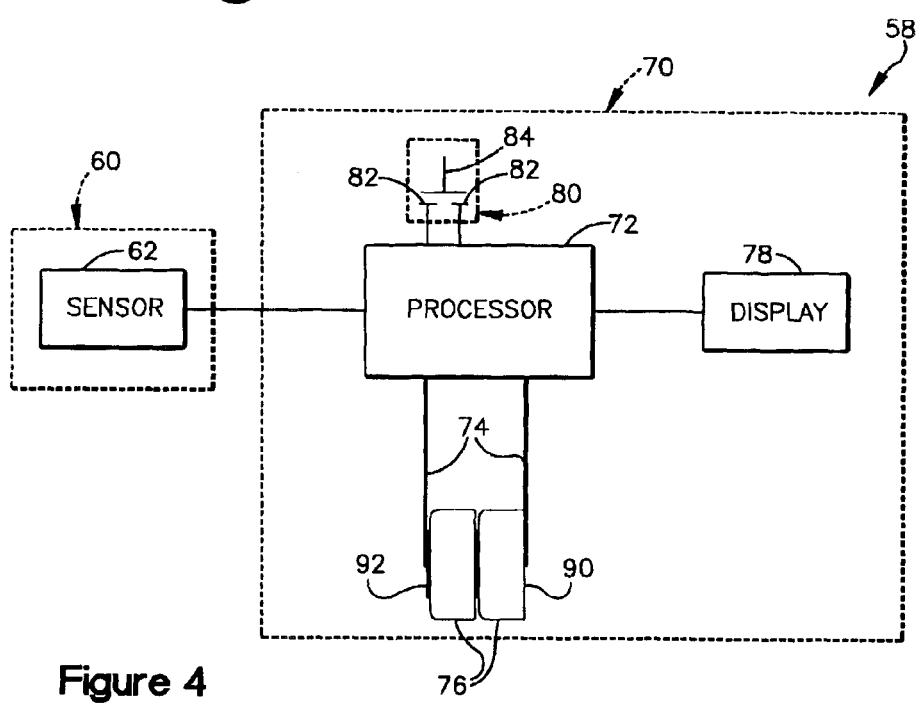
FIG. 4 is a schematic view of electronic circuitry of the gauge.

As shown in FIG. 4, the gauge 20 has electronic circuitry 58, which is divided into two sections. The first section is a sensing section 60 comprising an electronic pressure sensor 62. The second section is a display section 70 comprising a processor 72, a pair of battery clips 74, a pair of batteries 76, a display 78 and a switch 80. The switch 80 comprises a pair of electrical contacts 82 and a button assembly 84. The switch 80 is used to activate the electronic circuitry 58. Other types of switches may also be utilized with the invention. Moreover, other types of electronic circuitry 58 may be utilized, or a non-electronic pressure sensor may also be used, the invention not being limited to a device having electronic circuitry.

The sensing section 60 is exposed to the parameter to be measured through the inlet port 22. The sensing section 60 reacts to the exposure to the parameter in a manner that is indicative of the parameter. For example, in the present embodiment, the pressure sensor 62 reacts to exposure to the air pressure by outputting to the processor 72 an analog first signal indicative of the pressure.

The display section 70 displays a value indicative of the parameter based on the reaction of the sensing section 60. The components of the display section 70 are described as follows.

The processor 72 is normally in a dormant state to conserve electrical power. It is configured to switch to an active state in response to the contacts 82 being electrically shorted and to remain in the active state for 15 seconds afterward. The processor 72 is further configured, when in the active state, to receive the first signal and, in response, to send to the display 78 a digital second signal that is indicative of the highest pressure sensed since the processor 72 was last activated.

The display 78 is configured to receive the second signal and to display a numeric readout of the pressure as indicated by the second signal.

The batteries 76 are stacked in series to provide a supply voltage of about 3VDC across a positive end 90 and a negative end 92 of the stack of batteries 76. The batteries 76 are removably secured between the two battery clips 74, with one of the battery clips 74 contacting the positive end 90, and the other contacting the negative end 92. The clips 74 conduct the supply voltage to the processor 72.

Figure 5:
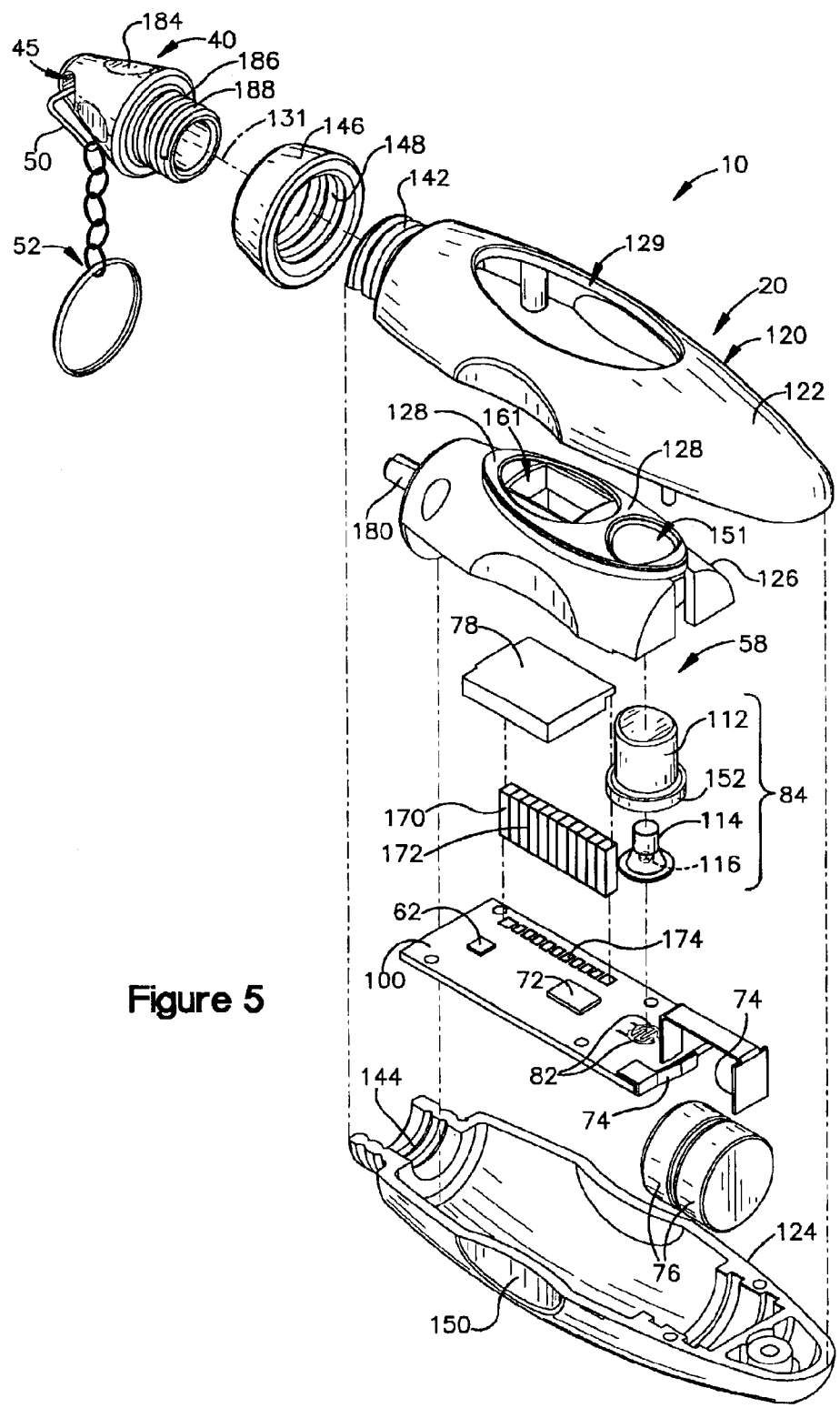
FIG. 5 is an exploded perspective view of components of the gauge and the cap.
Figure 6:
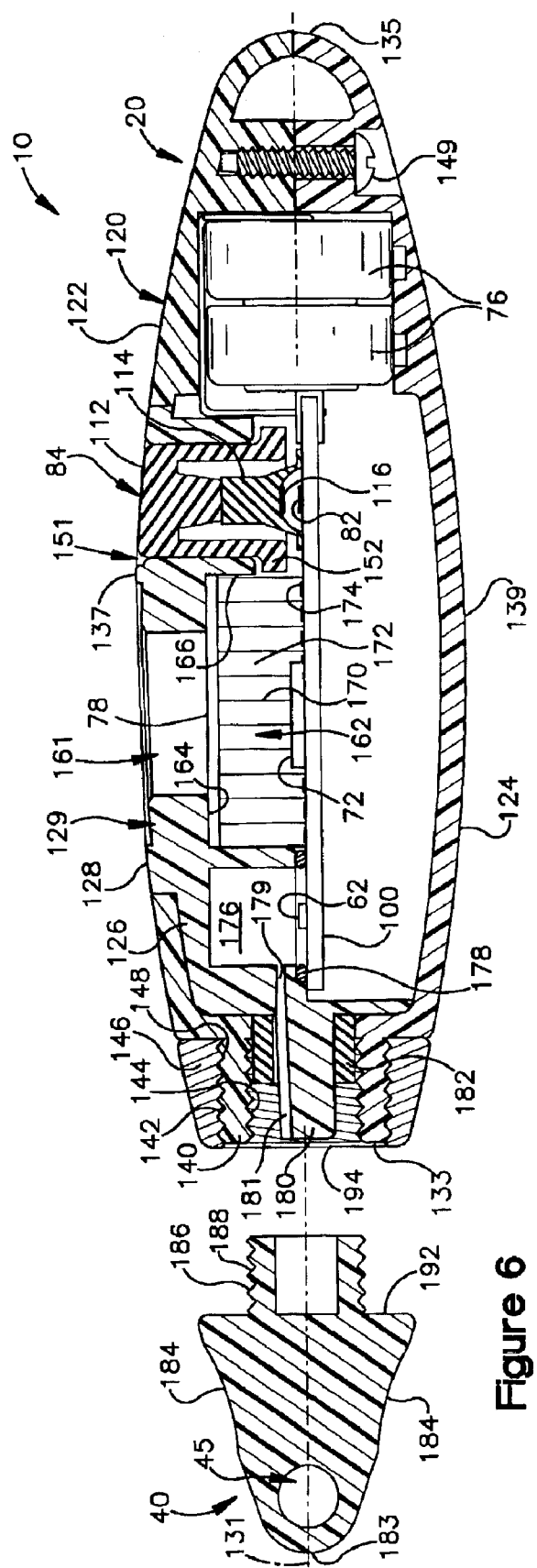
FIG. 6 is a sectional view of the components of FIG. 5, shown assembled together.

As shown in FIGS. 5 and 6, the sensor 62, the processor 72 and the battery clips 74 are mounted on a printed circuit (PC) board 100. The switch contacts 82 are printed on the PC board 100 in the form of PC pads.

The button assembly 84 comprises a rigid plastic button casing 112, an elastomeric button insert 114 positioned within the button casing 112, and an elastomeric electrically-conductive button pad 116 positioned within the button insert 114. The button insert 114 rests on the PC board 100, with the conductive button pad 116 spaced directly above the PC pads 82. When the button casing 112 is pressed downward toward the PC board 100, the button insert 114 is squeezed downward. This brings the button pad 116 into contact with the PC pads 82 to electrically short the PC pads 82 to activate the processor 72.

The gauge 20 has a housing 120 that encases the electronic circuitry 58. The housing 120 comprises an upper section 122, a lower section 124 and an inner section 126, all three of which are formed of rigid plastic. The inner section has an exposed portion 128, which protrudes through an opening 129 in the upper section 122 when the gauge 20 is assembled.

In the assembled condition shown in FIG. 6, the housing 120 is centered on an axis 131. The housing 120 has an axially front end 133, an axially rear end 135, a top end 137 and a bottom end 139. At the front end 133, the housing 120 has a tubular inlet structure 140, centered on the axis 131 and defining the inlet port 22. Half of the inlet structure 140 is embodied by the upper section 122, and the other half is embodied by the lower section 124. The inlet structure 140 has an outer screw thread 142 and an inner screw thread 144 that bounds the port 22.

A metal ring 146 has an inner screw thread 148 that engages the outer screw thread 142 of the inlet structure 140. This holds the upper and lower sections 122 and 124 of the housing 120 together at the front end 133. At the rear end, the upper and lower sections 122 and 124 are held together by a screw 149. The housing 120 has two flats 150 (FIG. 5), located at radially opposite sides of the housing 120. The flats 150 provide an area to be grasped by the fingers of a user.

The exposed portion 128 of the inner housing section 126 has a vertically extending first hole 151 for receiving the button 84 and communicating with the switch contacts 82 on the PC board 100. A flange 152 of the button casing 112 is larger than the first hole 151, so that the flange 152 is captured between the PC board 100 from below and the inner housing section 126 from above. The button 84 is thus captured in the housing 120. The button insert 114 elastically urges the button casing 112 upward, causing the flange 152 to abut the inner housing section 126. The button casing 112 can be pressed downward by the user to bring the button pad 116 into contact with the PC pads 82 to activate the processor 72 as explained above.

The exposed section 128 also has a rectangular second hole 161 through which the display 78 is visible to a user of the gauge 20. The display 78 is seated in a rectangular pocket 162 in the inner section 126 directly below the second hole 161. The pocket 162 has a horizontal abutment surface 164 surrounding the second hole 161 and four vertical side surfaces 166 that are configured to closely receive the display 78. The depth of the second hole 161, measured from the top surface 137 of the housing 120 to the display 78, is sufficiently deep to reduce sun glare. Other configurations and shapes of displays may also be used. For example, where a non-electronic gauge is utilized, the display may be mechanical.

A rubber block 170, resting on the PC board 100, presses the display 78 upward against the abutment surface 164. The rubber block 170 includes an array of vertically-extending electrically-conductive channels 172 which electrically connect pads 174 on a top surface of the PC board 100 to corresponding pads (not shown) on a bottom surface of the display 78. The conductive channels 172 conduct the second signal from the processor 72 to the display 78.

Referring to FIG. 6, the PC board 100 is fastened with screws (not shown) tightly against the inner housing section 126. In this configuration, the sensor 62 is located in a closed cavity 176 bounded by the PC board 100 and the inner housing section 126. An o-ring 178 provides a seal between the PC board 100 and the inner housing section 126. A duct 179 in the inner housing section 126 extends from the cavity 176 to the inlet port 22.

The inner housing section 126 has a cylindrical projection 180 extending axially forward into the inlet port 22. The projection 180 is configured to push down on a valve core within the valve stem 32 (FIG. 1) when the inlet port 22 is pushed over the valve stem 32, to release air from the tire 30. A groove 181 in the projection 180 extends rearward along the top of the projection 180 from the front of the projection 180 to the duct 179. The groove 181 serves to conduct the released air to the duct 179. A tubular rubber gasket 182 forms a seal between the valve stem 32 and the inner housing section 126, to prevent the air flowing to the duct 179 from escaping into the atmosphere. The duct 179, the projection 180, the groove 181 and the gasket 182 are thus together configured to convey the air through the inlet port 22 to the sensor 62. The sensor 62 is thus exposed to the air pressure through the inlet port 22.

The cap 40 has a general conical shape that is centered on the central axis 131 of the gauge 20 when the cap 40 is attached to the gauge 20. The cap 40 has a rounded apex 183 and four flats 184. The flats 184, configured to be grasped when turning the cap 40, are spaced apart symmetrically about the circumference of the cap 40. Each flat 184 exhibits a concave profile relative to a cross-section taken along the axis 131, such as the cross-section of FIG. 6. Each flat 184 exhibits a straight profile relative to a cross-section taken perpendicular to the axis 131.

In one embodiment, the cap 40 is designed to support the gauge 20 via a threaded section 186 having an outer screw thread 188 that mates with the inlet port 22 of the gauge 20. The outer screw thread 188 is configured to mate with the inner screw thread 144 of the inlet port 22. Accordingly, the cap 40 is removably attached to the gauge 20 by screwing the cap 40 onto the gauge 20. This is, more specifically, done by screwing the threaded section 186 of the cap 40 into the inner threaded section 142 surrounding the inlet port 22.

In the resulting installed position of the cap 40, the cap 40 covers the inlet port 22 and thus protects the inlet port 22 from damage. An annular rearwardly-facing surface 192 of the cap 40 engages an annular forwardly-facing surface 194 of the gauge 20 to form an annular seal. The seal surrounds the port 22, thereby preventing dust and moisture from entering the port 22.

In the preferred embodiment, the cap 40 is attached to the gauge 20 by the screw mechanism described above. However, other mechanisms for removably attaching the cap to the gauge are possible, such as a jam-fit or a releasable latch. For example, a pressure coupling (not shown) may be utilized instead of screw threads. The cap includes an annular flange for inserting into the inlet and the flange is configured to exert pressure on the inner walls of the inlet to hold the cap and the gauge together. Another type of mechanism for joining the cap to the gauge is a bayonet mount (not shown), where the cap includes an annular flange having bayonet threads for mating with bayonet threads provided in the inlet of the gauge. Other types of mounting mechanisms may also be utilized, as long as the mounting mechanism is configured to firmly support the gauge when so desired. It is also preferred that the selected mounting mechanism provide easy releasability. Moreover, other shapes and configurations for the cap may also be utilized, the invention not being limited to the configuration shown and described. The cap 40 also includes a mechanism for joining the gauge 20 to a hanging device, such as a key chain, a belt chain, a belt loop chain, a tether or otherwise while the following discussion is in the context of a key chain, it should be noted that other types of chains cores or otherwise are equally applicable to the present invention. For example, a mechanic may prefer to hook the gauge 20 and cap to a work station, rather than a key chain or belt loop, so that the gauge is readily at hand whenever necessary. The tether may include a cord, a chain, a string, a lash, a tie, a cable, or the like, and may be coupled to a fastener for joining the cap to a remote member.

The through-hole 45 of the cap 40 can receive the link 50 of the key chain 52, as mentioned above. The cap 40 and associated gauge 20 can thus be hung from the key chain 52 such that the cap 40 and the key chain 52 support the gauge 20. The link 50 also serves as a lever to facilitate twisting and untwisting the cap 40 onto and off of the gauge 20 where screw threads are utilized.

The procedure of screwing the cap 40 onto the gauge 20 ends with applying a clockwise torque to the cap 40 to tighten the mating surfaces 192 and 194 against each other with an abutting force that is sufficient to form the seal. The abutting force is also sufficient to provide enough friction between the mating surfaces 192 and 194 to prevent self-unscrewing of the cap 40. Similarly, the procedure of unscrewing the cap 40 from the gauge 20 starts with applying a counterclockwise torque to the cap 40 sufficient to overcome the friction between the mating surfaces 192 and 194.

Figure 7:
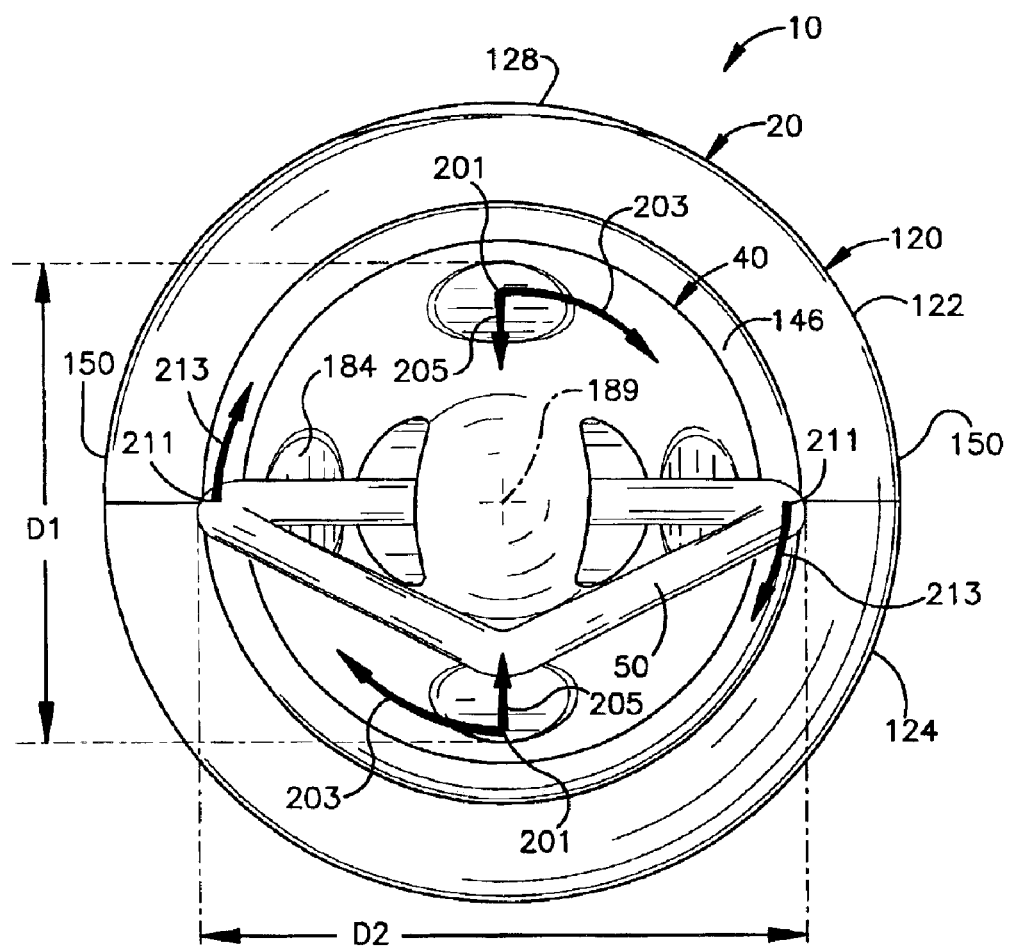
FIG. 7 is a front view illustrating a method of attaching the cap to the gauge.

A first method of screwing the cap 40 onto the gauge 20, illustrated in FIG. 7, entails grasping the gauge 20 with the left hand and twisting the cap 40 with the right hand. In this method, the thumb and index finger of the left hand engage the radially opposite flats 150 of the gauge housing 120. Concurrently, the thumb and index finger of the right hand engage radially opposite contact points 201 on radially opposite flats 184 of the cap 40. The fingers then apply a clockwise torque 203 to the cap 40, relative to the gauge 20, about the axis 131. A radially-inward force 205 must also be applied to provide traction between the fingers and the cap 40. The cap 40 is unscrewed from the gauge 20 in a similar fashion.

In a second, preferable, method of screwing the cap 40 onto the gauge 20, the link 50 is used to provide leverage. Specifically, the thumb and index finger of one hand respectively engage the link 50 at contact points 211 located at radially opposite sides of the link 50. The fingers then apply clockwise torque 213 about the axis 131 to tighten the cap 40 onto the gauge 20. The cap 40 is unscrewed according to the second method in a similar fashion, grasping the gauge 20 with fingers of one hand and untwisting the cap 40 with fingers of the other hand.

In the second method, the distance D2 between the contact points 211 for the second method can be greater than the distance D1 between the contact points 201 for the first method. The second method can thus provide greater leverage, thereby requiring less torque, than the first method. The link 50 of the cap 40 thus facilitates screwing and unscrewing the cap 40, by providing greater leverage and requiring less torque than without the link 50. The leverage is optimized if the hole 45 perpendicularly intersects the central axis 131 of the mating screw threads 144 and 188. Another reason the link 50 facilitates screwing and unscrewing of the cap 40 is that the torque is applied by direct abutment of the fingers against the link 50. This obviates the need for the radially-inward force 205 for providing traction.

The cap 40 and the gauge 20, connected together as in FIG. 3, define a cap/gauge assembly. This assembly is suitable for connecting to the user's key chain 52 or other mechanisms, which the user might normally keep in his/her pocket or hang from a piece of clothing, or otherwise make readily available for use. For this purpose, the gauge 20 and the cap 40, as shown in FIG. 2, together define a peripheral contour having a size that is suitable for fitting in a pocket and a shape that tapers off gradually from the middle of the assembly toward the front and rear ends 133 and 135 (FIG. 6). The contour is centered on, and even symmetric about, the axis 131, and is rounded at the front and rear ends 133 and 135. These features render the assembly comfortable to carry in a pocket. Other sizes and shapes may also be utilized, the invention not being limited to the sizes and shapes shown and described.

While the various features of the invention are shown and described in specific positions and configurations, many of the features may take on other locations and configurations, the invention not being limited to the specific examples shown and described.

For example, the preferred gauge 20, described above, measures air pressure. However, the gauge can measure other parameters than pressure, embodied by other media than air. For example, the parameter can be intensity or wavelength embodied by light. In such examples, the gauge would have a sensing section that is exposed to the intensity or wavelength of the light through an inlet port. The sensing section would react to this exposure in a manner indicative of the intensity or wavelength. A cap would be removably attachable to the gauge to cover and thus protect the port from damage or entry of dust or moisture. The cap would have a hole configured for attaching the cap to a key chain or other device.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

What is claimed is:

1. An apparatus comprising:
   a gauge for measuring a parameter, the gauge having a sensing section configured to react to exposure to the parameter in a manner indicative of the parameter, and the gauge further having a port through which the sensing section is exposed to the parameter; and
   a cap configured to be removably attached to the gauge such that the cap covers the port to protect the port from damage, the cap having a hole configured to allow coupling of the cap to another device.

2. The apparatus of claim 1 wherein the parameter is air pressure.

3. The apparatus of claim 1 wherein the parameter is air pressure of a tire, and the part is configured to be pushed over a valve stem of the tire.

4. The apparatus of claim 1 wherein the cap is further configured to prevent dust and moisture from entering the port.

5. The apparatus of claim 1 wherein a seal encircling the port is formed by and between the gauge and the cap.

6. The apparatus of claim 1 wherein the gauge has an internal screw thread surrounding the port, and the cap has a mating external screw thread, such that the cap is removably attached to the gauge by screwing the cap to the gauge.

7. The apparatus of claim 6 wherein the screw thread of the cap is centered on an axis, and the hole perpendicularly intersects the axis.

8. The apparatus of claim 1 wherein the hole is configured to receive a link of a key chain.

9. The apparatus of 1 wherein the gauge is a handheld gauge.

10. The apparatus of claim 9 wherein the parameter is air pressure.

11. The apparatus of claim 10 wherein the port is configured to be pushed over a valve stern of a tire.

12. The apparatus of claim 9 wherein the cap is further configured to prevent dust and moisture from entering the port.

13. The apparatus of claim 9 wherein the gauge has an internal screw thread surrounding the port, and the cap has a mating external screw thread, such that the cap is removably attached to the gauge by screwing the cap to the gauge.

14. The apparatus of claim 9 wherein the screw thread of the cap is centered on an axis, and the hole perpendicularly intersects the axis.

15. The apparatus of claim 9 wherein the gauge and the cap are configured to fit in a user's pocket while removably attached together.

16. An apparatus comprising:
    a gauge for measuring air pressure, the gauge having an inlet port for communicating with a source of the air pressure;
    means for supporting the gauge, removably attachable to the gauge; and
    tether means for tethering the supporting means to a remote member;
    wherein the means for supporting the gauge is a cap having a plug for inserting into the inlet port, with the plug and the inlet port being configured to couple together.

17. The apparatus of claim 16, wherein the plug of the cap includes an internal screw thread and the inlet port includes a mating external screw thread for coupling the plug to the inlet port.

18. The apparatus of claim 16 wherein the gauge is a handheld gauge.

19. The apparatus of claim 16 wherein the port is configured to be pushed over a valve stem of a tire.

20. The apparatus of claim 16 the cap is configured to prevent dust and moisture from entering the port.

21. The apparatus of claim 16 wherein a seal encircling the port is formed by and between the gauge and the cap.

22. The apparatus of claim 16 wherein the gauge and the cap are configured to fit in a user's pocket while removably attached together.

* * * * *

UNITED STATES PATENT AND TRADEMARK OFFICE
CERTIFICATE OF CORRECTION

PATENT NO. : 6,918,291 B2
DATED : July 19, 2005
INVENTOR(S) : Durr et al.

It is certified that error appears in the above-identified patent and that said Letters Patent is hereby corrected as shown below:

Column 7,
Line 44, "part" should read -- port --.

Column 8,
Line 6, insert -- claim -- before "1".
Line 10, "stern" should read -- stem --.
Line 46, insert -- wherein -- after "16".

Signed and Sealed this

Fourteenth Day of February, 2006

JON W. DUDAS
*Director of the United States Patent and Trademark Office*